May 24, 1960 W. KASTEN 2,937,754
FILTER
Filed March 19, 1957
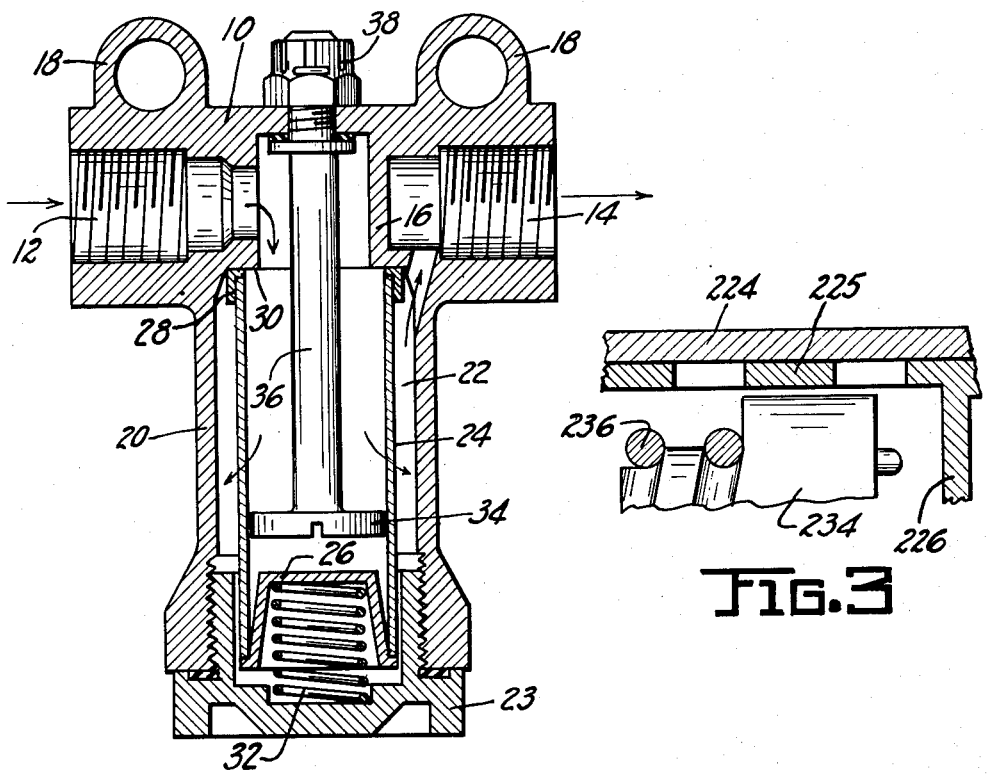
FIG.1
FIG.3
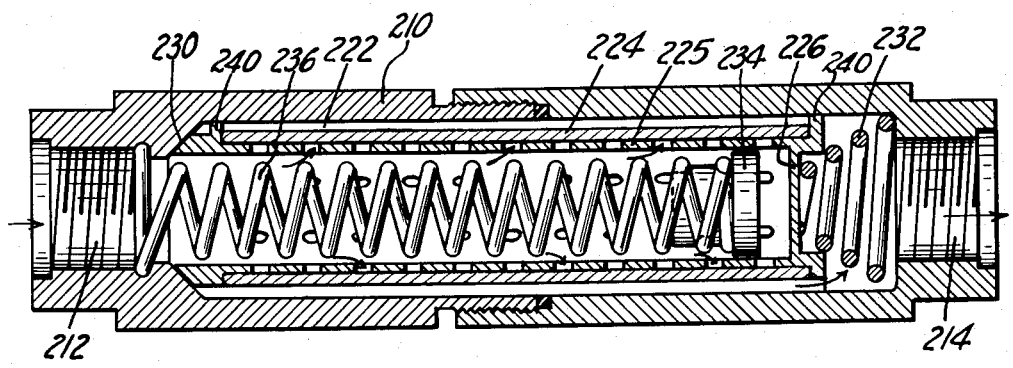
FIG.2
INVENTOR.
WALTER KASTEN
BY
William N. Antonia
ATTORNEY United States Patent Office 2,937,754
Patented May 24, 1960

2,937,754
FILTER

Walter Kasten, Royal Oak, Mich., assignor to Bendix Aviation Corporation, South Bend, Ind., a corporation of Delaware Filed Mar. 19, 1957, Ser. No. 647,128
9 Claims. (Cl. 210—131)

This invention relates to fluid filtering devices having by-pass valves, and more particularly to filtering devices utilizing the filter element itself as the by-pass valve.

In designing a filter assembly with a by-pass valve, oftentimes, it is very convenient to locate the by-pass valve in line with the inlet port, as shown in Winzen Patent 2,693,281. One of the disadvantages of this type of an arrangement is that under certain operating conditions the impingement of the fluid on the by-pass valve has a tendency to cause erratic operation thereof. Thus, under some conditions the by-pass valve may open long before the normal opening pressure of the by-pass valve has been reached, and unfiltered fluid will pass through the system.

One of the simplest ways of providing a by-pass valve in "line type" filters, as shown in Figure 1 of the drawings, or in "in line type" filters, as shown in Figure 2 of the drawings, is to make the filter element itself the by-pass valve. The major disadvantage of this type of arrangement, especially in the case of the "in line type" filter, is that the incoming fluid will have a tendency to impinge on the element and may under certain conditions cause malfunctioning of the element as a by-pass valve.

It is, therefore, an object of this invention to provide an arrangement whereby the filter element itself will act as a by-pass valve, but will function as such only after having been clogged by contaminants to such an extent that a sufficient amount of fluid is not passing therethrough.

Another object of this invention is to provide in a filtering device utilizing the filter element itself as the by-pass valve, means for preventing the erratic operation of the filter element as such valve.

A further object of this invention is to provide a snubbing member within the filter element in order to prevent the incoming fluid for impinging on the bottom of the filter element and causing it to move from its valve seat as a result of surges in the flow of fluid.

The above and other objects and features of the invention will become apparent from the following description taken in connection with the drawings which form a part of this invention and in which:

Figure 1 is a sectional view of a "line type" filter incorporating my invention;

Figure 2 is a sectional view of an "in line type" filter incorporating my invention; and Figure 3 is an enlarged section showing the relative clearance between the impingement resistor and the filter element of Figure 2.

Referring to Figure 1, numeral 10 designates a filter housing having a fluid inlet passage 12 and a fluid outlet passage 14 separated by a wall 16. The inlet and outlet passages are threaded to receive suitable fittings for installation of the device in a fuel or lubrication line or the like. Brackets 18 formed integrally with the housing are provided for mounting the filter on an engine, afterburner control, or other mechanism. The housing 10 has a cylindrical portion 20 forming a passage 22 which communicates the inlet and outlet passages 12 and 14. The open end of the cylindrical portion 20 is closed by a plug 23.

The cylindrical filter element, designated by numeral 24, may consist of braided or standed wire or other suitable filtering material. One end of the filter element is closed by a retainer 26 and the other end has a ring 28 attached thereto for seating on valve seat 30 which is formed on housing 10. A spring 32 located between the plug 23 and the retainer 26 urges the filter element against the valve seat 30. As a result of this arrangement, the filter element itself becomes the by-pass valve. In order to prevent erratic operation of the filter element as a by-pass valve due to surges in the flow of fluid through the filter element, I have provided a snubber or impingement resistor 34 which extends within the filter element 24 and is connected to the housing 10 by means of a rod 36 and nut 38. The snubber is positioned near the retainer 26 so that the open area of that portion of the filter element 24 located between the snubber 34 and the retainer 26 will be greater than the clearance area between the snubber and the filter element 24. The term "open area" is meant to be understood as the total area of the filter pores. In the case of a screen, it would be the total screen area minus the wire area.

In the operation of the filter shown in Figure 1, fluid such as fuel or oil enters the inlet passage 12, passes into the inside of filter element 24, through the filter element, and passes upwardly and out through outlet passage 14. As the filter continues to operate, foreign matter such as solid particles, sludge and the like, will accumulate on the internal surface of the filter element, gradually decreasing the permeability thereof. As the element becomes clogged and the pressure differential across the filter element rises sufficiently to overcome spring 32, the element 24 will move away from valve seat 30, thereby permiting some of the fluid to completely by-pass the filter element. In order to prevent the flow of fluid from impinging directly on the retainer 26 and causing the filter element 24 to move away from seat 30 as a result of surges in fluid flow, snubber 34 is placed within the filter element to dampen the force of the fluid against the retainer. By using such a snubber, it can readily be seen that the incoming fluid cannot impinge on the retainer or bottom end of the filter element, but will impinge on the snubber which is attached to the filter housing. Whenever, the incoming fluid impinges against the snubber there will be a rise in pressure in the space formed by the inside of the element, the snubber and the inlet port, but this pressure will not be exerted against the bottom of the filter because the small clearance between the snubber and the filter element is considerably less than the open area of that portion of the filter element downstream of the snubber clearance. The snubber in effect tends to absorb the shock of impingement due to the flow of the incoming fluid.

Figure 2 shows my invention in conjunction with an "in line type" filter. In this figure like parts are designated by like numerals plus 200. The two piece cylindrical housing 210 has a fluid inlet passage 212 and a fluid outlet passage 214 connected by a passage 222. Filter element 224 is located in passage 222 and includes a perforated core 225, one end of which is formed as a retainer 226 which closes one end of the filter element, and the other end of which is formed to seat on valve seat 230. A spring 232 located between the retainer 226 and a shoulder on housing 210 urges the filter element against valve seat 230. The snubber or impingement resistor 234 is similar to that of Figure 1, except that it is connected to the housing by means of a helical spring 236. As shown in Figures 2 and 3, one end of the spring is retained in a groove formed in inlet passage 212 and the other end of the spring is retained in the spiral grooves formed on the end of snubber 234. The operation of the device is also essentially the same as that of Figure 1, except that since a helical spring is used to connect the snubber to the housing, any rise in pressure due to fluid impingement against the snubber will result in a slight stretching of the spring 236 and a moving of the snubber 234 away from the inlet port, thus providing a smoother absorbment of the shock of impingement due to the flow of the incoming fluid. The core is also shown as having centering guides 240 (three on each end) in order to permit uniform movement of the filter element when acting as a by-pass valve. Figure 3 shows an enlarged section of a portion of Figure 2 which indicates the relative clearances between the snubber and the filter element, and the snubber and the retainer.

Although my invention has been described in connection with certain specific embodiments, the principles are susceptible to numerous other applications that will readily occur to persons skilled in the art.

I claim:

1. In a fluid filtering device comprising a housing having a fluid inlet passage and a fluid outlet passage, and a movable filtering element between said passages having one end thereof abutting said housing to form by-pass valve means therewith: means located within said filter element for snubbing the action of the fluid within said filter element, said last mentioned means including an impingement resistor positioned near the other end of said filter element, and a member having one end thereof operatively connected to said impingement resistor and the other end thereof operatively connected to said housing.

2. A fluid filtering device comprising a housing having a fluid inlet passage and a fluid outlet passage, passage means connecting said inlet and outlet passages, a valve seat formed between said inlet and outlet passages, a movable filter element having one end thereof seated on said valve seat, resilient means between said housing and said filter element urging said element against said valve seat, and means located within said filter element for snubbing the action of the fluid within said filter element, said last mentioned means including an impingement resistor positioned near the other end of said filter element, and a member having one end thereof operatively connected to said impingement resistor and the other end thereof operatively connected to said housing.

3. A fluid filtering device comprising a housing having a fluid inlet passage and a fluid outlet passage, passage means connecting said inlet and outlet passages, a valve seat formed between said inlet and outlet passages, a hollow movable filter element having one end thereof seated on said valve seat, a retainer attached to the other end of said filter element, resilient means between said housing and said retainer urging said filter element against said valve seat, an impingement resistor located within said filter element near the other end thereof for snubbing the action of the fluid against said retainer, and a member located within said filter element having one end thereof operatively connected to said impingement resistor and the other end thereof operatively connected to said housing.

4. A fluid filtering device comprising a housing having a fluid inlet passage and a fluid outlet passage, passage means connecting said inlet and outlet passages, a valve seat formed on said housing between said inlet passage and said passage means, a hollow movable cylindrically shaped filter element located in said passage means and having one end thereof seated on said valve seat, a retainer attached to the other end of said filter element, spring means between said housing and said retainer urging said filter element against said valve seat, an impingement resistor located within said filter element near the other end thereof for snubbing the action of the fluid against said retainer, and a member located within said filter element having one end thereof operatively connected to said impingement resistor and the other end thereof operatively connected to said housing.

5. In a fluid filtering device comprising a housing having a fluid inlet passage and a fluid outlet passage, and a movable cylindrical filtering element between said passages having one end thereof abutting said housing to form by-pass valve means therewith: means for snubbing the action of the fluid within said filter element, said means comprising an impingement resistor positioned within and near said other end of said filter element so that the open area of that portion of the filter element between the resistor and the other end of the filter element is greater than the clearance area between the resistor and the filter element, and a member located within said filter element having one end thereof operatively connected to said impingement resistor and the other end thereof operatively connected to said housing.

6. A fluid filtering device comprising a housing having a fluid inlet passage and a fluid outlet passage, passage means connecting said inlet and outlet passages, a valve seat formed on said housing between said inlet passage and said passage means, a hollow movable cylindrically shaped filter element located in said passage means and having one end thereof seated on said valve seat, a retainer attached to the other end of said filter element, spring means between said housing and said retainer urging said filter element against said valve seat, an impingement resistor located within said filter element for snubbing the action of the fluid against said retainer, said resistor being positioned within and at the other end of said filter element so that the open area of the filter element between the resistor and the retainer is larger than the clearance area between the resistor and the filter element, and a member located within said filter element having one end thereof operatively connected to said impingement resistor and the other end thereof operatively connected to said housing.

7. A fluid filtering device comprising a housing having a fluid inlet passage and a fluid outlet passage, passage means connecting said inlet and outlet passages, a valve seat formed on said housing between said inlet passage and said passage means, a hollow movable cylindrically shaped filter element located in said passage means and having one end thereof seated on said valve seat, a retainer attached to the other end of said filter element, spring means between said housing and said retainer urging said filter element against said valve seat, a movable impingement resistor located within said filter element for snubbing the action of the fluid against said retainer, and resilient means located within said filter element having one end thereof operatively connected to said impingement resistor and the other end thereof operatively connected to said housing.

8. In a fluid filtering device comprising a housing having a fluid inlet passage and a fluid outlet passage, and a movable cylindrical filtering element between said passages having one end thereof abutting said housing to form by-pass valve means therewith: means located within said filter element for snubbing the action of the fluid within said filter element, said means comprising a movable impingement resistor positioned near the other end of said filter element, and resilient means having one end thereof operatively connected to said impingement resistor and the other end thereof operatively connected to said housing.

9. A fluid filtering device comprising a housing having a fluid inlet passage and a fluid outlet passage, passage means connecting said inlet and outlet passages, a valve seat formed on said housing between said inlet passage and said passage means, a hollow movable cylindrically shaped filter element located in said passage means and having one end thereof seated on said valve seat, a retainer attached to the other end of said filter element, spring means between said housing and said retainer urging said filter element against said valve seat, a rod located within said filter element, means located at one end of said rod for connecting same to said housing, and a flange-like member formed on the other end of said rod and located near said retainer for snubbing the action of the fluid against said retainer.

References Cited in the file of this patent

UNITED STATES PATENTS

| 2,287,344 | Easton | June 23, 1942 |
| 2,422,647 | Vokes | June 17, 1947 |

FOREIGN PATENTS

| 446,027 | Great Britain | Apr. 23, 1936 |
| 700,661 | Great Britain | Dec. 9, 1953 |